United States Patent
Hedaoo et al.

(10) Patent No.: US 11,836,699 B1
(45) Date of Patent: Dec. 5, 2023

(54) SYSTEMS AND METHODS FOR CONTINUOUS AVAILABILITY OF ACCOUNT INFORMATION

(71) Applicant: Wells Fargo Bank, N.A., San Francisco, CA (US)

(72) Inventors: Shailesh Hedaoo, Fremont, CA (US); Benjamin Soccorsy, Larkspur, CA (US); Manish Adeshara, Fremont, CA (US); Ashish G. Khapre, Fremont, CA (US); Chintan Mehta, San Ramon, CA (US); Manoj Thorat, Fremont, CA (US); Ajith Thoutu, Dublin, CA (US); Priyank Tiwari, Irving, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/802,362

(22) Filed: Feb. 26, 2020

Related U.S. Application Data

(60) Provisional application No. 62/916,665, filed on Oct. 17, 2019.

(51) Int. Cl.
*G06Q 20/32* (2012.01)

(52) U.S. Cl.
CPC ..... *G06Q 20/3221* (2013.01); *G06Q 20/3223* (2013.01)

(58) Field of Classification Search
None
See application file for complete search history.

(56) References Cited

U.S. PATENT DOCUMENTS

| | | | | |
|---|---|---|---|---|
| 2015/0205722 A1* | 7/2015 | Chiu | ................... | G06F 12/0828 714/4.11 |
| 2019/0372834 A1* | 12/2019 | Patil | ...................... | H04L 41/085 |
| 2021/0049614 A1* | 2/2021 | Jurss | .................. | G06Q 20/4012 |

OTHER PUBLICATIONS

Apache Storm 2.0 Tutorial, Feb. 24, 2020, pp. 1-10.
Arpaci-Dusseau, Remzi. Staged Event-Drive Architecture https://www.cs.wisc.edu/, pp. 1-24.
Halle et al., "A Formalization of Complex Event Stream Processing", 2014 IEEE 18th International Enterprise Distributed Object Computing Conference. 10 pages.
Lakshman et al., "Cassandra—A Decentralized Structured Storage System", ACM SIGOPS Operating Systems Review, 44(2), 2010, 6 pages.
Microbenchmarking Storm; Cloudera Community, Nov. 25, 2019, pp. 1-5.
Reifer, D., "Software Failure Modes and Effects Analysis", IEEE Transactions on Reliability, vol. R-28, No. 3. Aug. 1979, 3 pages.

\* cited by examiner

*Primary Examiner* — Namrata Boveja
*Assistant Examiner* — Amit Patel
(74) *Attorney, Agent, or Firm* — Foley & Lardner LLP

(57) ABSTRACT

A system including a network interface circuit and a processing circuit. The processing circuit includes one or more processors coupled to non-transitory memory. The processing circuit is configured to receive a request for account information. The account information relates to an account of a user. The processing circuit is further configured to perform asynchronous data gathering to retrieve the account information based on the request. The processing circuit is further configured to provide the account information to an active cache of a user device. The account information is stored in the active cache of the user device for later retrieval.

20 Claims, 5 Drawing Sheets

SYSTEMS AND METHODS FOR CONTINUOUS AVAILABILITY OF ACCOUNT INFORMATION

CROSS-REFERENCE TO RELATED APPLICATION

The present application claims the benefit of and priority to U.S. Patent Application No. 62/916,665 titled "SYSTEMS AND METHODS FOR CONTINUOUS AVAILABILITY OF ACCOUNT INFORMATION" filed Oct. 17, 2019, which is incorporated herein by reference in its entirety.

TECHNICAL FIELD

The present disclosure relates generally to the field of data management. More particularly, the present disclosure relates to systems and methods for providing continuous data availability.

BACKGROUND

As part of account management, users may establish accounts with various entities that provide services (e.g., financial institutions, social media providers, rental companies, government entities, etc.). In standard systems, account information associated with a user may be stored in a remote computing system separate from the user. To access the user's account information, the user may have to make requests in real-time to the remote computing system. However, if a connection between the user and the computing system is slow or unavailable, the user may not be provided with their account information, and instead may receive an error message or other response/outcome that can be frustrating to the user. Further, any interactions (e.g., purchases, updates to account information, etc.) the user attempts may be completely denied if the computing system cannot be accessed. These and other effects of hampered connections can harm user experience.

SUMMARY

One embodiment of the disclosure relates to a system including a network interface circuit and a processing circuit. The processing circuit includes one or more processors coupled to non-transitory memory. The processing circuit is configured to receive a request for account information. The account information relates to an account of a user. The processing circuit is further configured to perform asynchronous data gathering to retrieve the account information based on the request. The processing circuit is further configured to provide the account information to an active cache of a user device. The account information is stored in the active cache of the user device for later retrieval.

Another embodiment relates to a mobile device including a processing circuit. The processing circuit includes one or more processors coupled to non-transitory memory. The processing circuit is configured to receive a request for account information from a user. The account information relates to an account of the user. The processing circuit is configured to determine a status of a system coupled to the mobile device for retrieving the account information. The processing circuit is configured to, in response to a determination that the backend system is inaccessible, serve the account information to the user via an active cache of the mobile device. The active cache is configured to store the account information.

A further embodiment relates a method performed by a mobile device. The method includes receiving a request for account information. The account information relates to an account of a user. The method includes determining a status of a backend system for retrieving the account information. The method includes, in response to a determination that the backend system is inaccessible, serving the account information to the user via an active cache of the mobile device. The active cache is configured to store the account information.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1A:
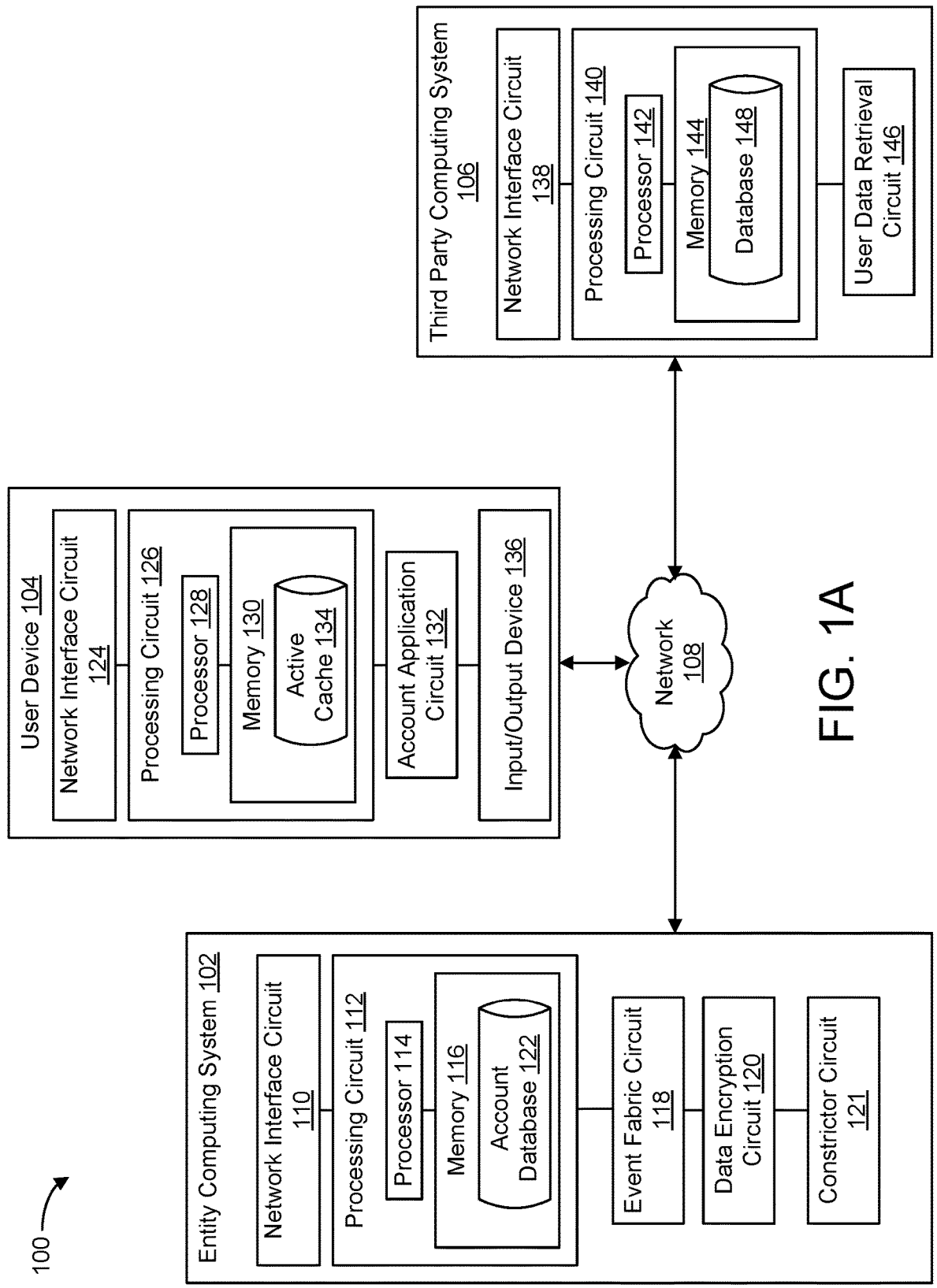
FIG. 1A is a block diagram of an account management system, according to some embodiments.

Referring generally to the FIGURES, systems and methods for mitigating effects of server issues on user experience are shown and described, according to various embodiments herein. Users can establish accounts with various entities that can provide accounts to the users. For example, a user may establish an account with a financial institution to access financial information, a social media company for managing a public presence, a university to access academic information, and/or with any other various entities capable of providing accounts for users. As referred to herein, account information can include any information relating to a user's account provided by a particular entity. If a user establishes an account with an entity, the user may expect to have immediate and continuous access to account information relating to their account. For example, if the user establishes a checking account with a financial institution, the user may expect to be able to access a website or application to obtain immediate knowledge of a current balance of the checking account.

If account information is directly provided via backend systems, difficulty in accessing the backend systems can negatively impact user experience and can result in unnecessary aggravation for a user. Further, trouble in accessing backend systems may have a direct impact on livelihoods of users if not otherwise addressed. For example, if a user needs to pay a bill and a backend system that handles said payment is inaccessible, the user may incur late fees, be subject to legal proceedings, etc., if the payment cannot be processed on time. To mitigate these and other negative impacts on users, continuous availability as described herein can be provided to the user to ensure transactions are not denied as a result of a failure to access backend systems.

Continuous availability refers to an ability for a user to interact with their account (e.g., access account information, initiate transactions, etc.) at all or mostly all times regardless of an availability of a backend system(s) (at least for an amount or significant amount of time if a backend system fails or has accessibility issues). Inaccessibility of account information can refer to any of various complications that can reduce and/or eliminate accessibility of account information. For example, inaccessibility can result from problems such as power failure of backend systems, high traffic conditions in databases that significantly increases retrieval time of account information, an inability to access third party services that store account information, a connection failure between a user device and a network, etc. In this way, continuous availability, as described in detail below, can be implemented to circumvent inaccessibility of account information and other issues.

In particular and as described herein, an active cache can be established to provide continuous availability of account functionality to a user. The active cache can store account information, transactions, and/or other information associated with user accounts such that users are provided with at least some account functionality irrespective of a status of backend systems. The active cache can be implemented on a user device of the user, a cloud computing system, and/or various other devices/systems separate from backend systems. The active cache can provide a way for users to access their account information even if backend systems are inaccessible.

In some embodiments, active cache is implemented as a cache for quick accessibility of account information. As compared to random access memory (RAM) or read only memory (ROM), the active cache can be more quickly accessed for account information. Account information may not require significant amounts of storage, and as such, a cache may be appropriate. However, in some embodiments, the active cache is implemented in another type of data storage medium (e.g., RAM, ROM, an external hard drive, a solid state drive, etc.).

The active cache can provide a number of advantages as compared to other types of caches (e.g., a passive cache). In particular, the active cache can be proactively updated as compared to a passive cache which may be reactively updated. In proactive updating, the active cache can operate to obtain new data if a determination is made that new data may be required and/or should be obtained. In reactive updating, the passive cache may only be able to store new information as it is received. In other words, the passive cache may not operate to update information stored therein. As should be appreciated, proactive updating of the active cache can increase a probability that the active cache stores an updated version of required information at a given time.

Upon initially accessing account information (e.g., the first time a user accesses their account information on a particular device), the active cache can be populated with information retrieved from a backend system(s). Afterwards, if a user desires to retrieve their account information, a determination can be made as to whether the account information can be accessed from databases and/or other sources directly (i.e., a backend system(s) that manages account information is accessible). If the account information can be accessed directly, the account information can be retrieved and provided to the active cache in order to update account information stored in the active cache. The updated account information can be provided from the active cache to the user to fulfill the request. However, if the desired account information cannot be accessed directly (i.e., backend systems are inaccessible), account information previously stored in the active cache can be provided to the user. While the previously stored account information may not be the most up-to-date information, the previously stored account information can nonetheless provide the user with an understanding of a status of their account. In this way, inaccessibility of account information from backend systems does not completely negate an ability for users to access information regarding their account.

Additionally, the active cache can benefit users by allowing transactions to be honored/enabled even if backend systems to process said transactions are unavailable. As described herein, transactions can include any action that may result in some change to account information. For example, transactions may include financial transactions (e.g., purchasing an item from an online marketplace, transferring account balances, etc.), a request by the user to update their personal information (e.g., phone number, address, email, etc.), a post to a social media account, etc. By utilizing the active cache, transactions may not be immediately denied as a result of the backend system(s) being inaccessible. Rather, the transaction can be stored in the active cache and reattempted over time until the transaction is successfully provided to and processed by the backend system. In this way, the original state of the transaction (e.g., a date of the transaction, a time of the transaction, changes associated with the transaction, etc.) can be honored such that the transaction is processed as if it were received at an actual time the transaction occurred.

The active cache can be updated upon various events occurring. For example, if an entity providing an account is a financial institution that provides financial services (e.g., checking services, credit card services, mortgage services, etc.) for users, the active cache can be updated any time a financial transaction occurs, when users access their account, and/or when any other event occurs that is associated with a user account. In this case, for example, every time a user makes a purchase, receives money, accesses account information, and/or performs any other activities related to their account, the active cache can be updated while backend systems are accessible to reflect current account information (e.g., a current balance of checking and credit card accounts). In this way, if the backend systems become unavailable, the active cache may nonetheless have up-to-date or near up-to-date account balances and other information.

It should be appreciated that the present disclosure is not limited to financial institutions and financial accounts associated therewith. The systems and methods for storing and providing account information via an active cache as described herein can be applied to various entities that maintain user accounts. For example, the active cache can be applied to entities such as social media entities, online marketplaces, government institutions, etc. In any case, the active cache along with the other systems and methods described herein can free customer interactions from changing, slow, and expensive real-time dependencies.

Referring now to FIG. 1A, a block diagram of an account management system 100 is shown, according to some embodiments. As will be described in further detail below, account management system 100 can allow users to access account information describing their accounts regardless of whether a backend system is directly accessible. As shown, account management system 100 includes, among other systems, an entity computing system 102, a user device 104, and a third party computing system 106. Entity computing system 102 is shown to be communicatively and operatively coupled to user device 104 and third party computing system 106 over a network 108. Network 108 can provide communicable and operative coupling between entity computing system 102, user device 104, third party computing system 106, and/or other components disclosed and described herein to provide and facilitate the exchange of communications (e.g., data, instructions, messages, values, commands, etc.). Accordingly, network 108 may include any network including wired (e.g., Ethernet) and/or wireless networks (e.g., 802.11X, ZigBee, Bluetooth, WiFi, etc.). In some embodiments, network 108 includes the Internet. In some embodiments, network 108 includes a proprietary banking network to provide secure or substantially secure communications.

Account management system 100 is shown to include user device 104. User device 104 can be any sort of computing device associated with a user. The user associated with user device 104 may be an account holder of at least one account managed by the account provider (associated with entity computing system 102). User device 104 can include any type of computing device that may be used to access and/or modify account information of accounts relating to the user. In some embodiments, the user utilizes user device 104 to access account information that is stored and/or otherwise managed by entity computing system 102. In this regard, user device 104 may include any wearable or non-wearable device. Wearable devices refer to any type of device that an individual wears including, but not limited to, a watch (e.g., a smart watch), glasses (e.g., eye glasses, sunglasses, smart glasses), bracelet (e.g., a smart bracelet), etc. User device 104 may also include any type of mobile device including, but not limited to, a phone (e.g., smart phone), a tablet, a personal digital assistant, etc. In some embodiments, user device 104 includes other computing devices such as a desktop computer, a laptop computer, etc.

As shown in FIG. 1A, user device 104 can include a network interface circuit 124 enabling user device 104 to exchange information over network 108, a processing circuit 126, and an input/output device 136. Network interface circuit 124 can include program logic that facilitates connection of user device 104 to network 108. Network interface circuit 124 can support communication between user device 104 and other systems, such as entity computing system 102. For example, network interface circuit 124 can include a cellular modem, a Bluetooth transceiver, a Bluetooth beacon, a radio-frequency identification (RFID) transceiver, and a near-field communication (NFC) transmitter. In some embodiments, network interface circuit 124 includes the hardware and machine-readable media sufficient to support communication over multiple channels of data communication. Further, in some embodiments, network interface circuit 124 includes cryptography capabilities to establish a secure or relatively secure communication session between user device 104 and entity computing system 102 and/or third party computing system 106. In this regard, information (e.g., account information, login information, financial data, and/or other types of data) may be encrypted and transmitted to prevent or substantially prevent a threat of hacking.

Processing circuit 126 is shown to include a processor 128 and memory 130. Processor 128 may be implemented as one or more application specific integrated circuits (ASICs), field programmable gate arrays (FPGAs), a group of processing components, or other suitable electronic processing components. Memory 130 may be one or more devices (e.g., RAM, ROM, Flash memory, hard disk storage) for storing data and/or computer code for completing and/or facilitating the various processes described herein. Memory 130 may be or include non-transient volatile memory, non-volatile memory, and non-transitory computer storage media. Memory 130 may include database components, object code components, script components, or any other type of information structure for supporting the various activities and information structures described herein. Memory 130 may be communicably coupled to processor 128 and include computer code or instructions for executing one or more processes described herein.

User device 104 is shown to include an account application circuit 132. Account application circuit 132 is configured to facilitate management of user accounts on user device 104 and allow the user to interact with their accounts. In some embodiments, account application circuit 132 is structured to provide displays to user device 104 (e.g., to I/O device 136 described below) that enable the user to view and/or manage user accounts. Accordingly, account application circuit 132 can be configured to send information to and receive information from entity computing system 102. In some embodiments, account application circuit 132 may provide an application/website (e.g., a mobile banking application, a social media application, a mobile wallet application, etc.) for the user to interact with. In some embodiments, account application circuit 132 may be downloaded as software by user device 104 prior to its usage and hard-coded into memory 130. In some embodiments, account application circuit 132 is implanted via a web browser as a web-based interface application. In some embodiments, account application circuit 132 includes an application programming interface (API) and/or a software development kit (SDK) that facilitate the integration of other applications with account application circuit 132.

Account application circuit 132 can allow a user to access account information tied to user accounts associated with the user. As described above, account application circuit 132 can be implemented as an application on user device 104. For example, account application circuit 132 may be implemented as a banking application associated with a financial institution (e.g., that operates entity computing system 102) and allows the user to access a checking account, a savings account, loan/mortgage information, a credit score, etc. As another example, account application circuit 132 may be implemented as a social media application that allows the user to interact with a social media account of the user. In some embodiments, account applicant circuit 132 constitutes a web browser hard coded into memory 130 and includes executable instructions that allow user device 104 to communicate with various systems (e.g., entity computing system 102) via a communications protocol (e.g., the HTTP protocol).

In some embodiments, the user interacts with account application circuit 132 via I/O device 136. I/O device 136 can include hardware and associated logics that enable the user to exchange information with user device 104. An input component of I/O device 136 can allow the user to provide information to user device 104. The input component may various hardware and associated logics such as, for example, a mechanical keyboard, a mechanical mouse, a touchscreen, a microphone, a camera, a fingerprint scanner, etc. Likewise, an output component of I/O device 136 can include hardware and associated logics that allow user device 104 to provide information to the user. For example, the output component may include a digital display, a speaker, illuminating icons, LEDs, etc. In this way, the user can interact with account application circuit 132. For example, the user may provide login information (e.g., username, password, etc.) by typing on a mechanical keyboard of I/O device 136 and be provided account information on a digital display component of I/O device 136.

Still referring to FIG. 1A, memory 130 is shown to include an active cache 134. Active cache 134 can be configured to store and serve data associated with the user's account. For example, if the user confirms their identity via account application circuit 132 (e.g., via logging in), active cache 134 can serve account information associated with the user's account directly to account application circuit 132 such that account application circuit 132 can serve (e.g., display) the account information to the user.

Active cache 134 can operate as a source of account information for account application circuit 132. In other words, active cache 134 can provide account information to account application circuit 132 that, in standard systems, may otherwise be provided by an external system/device (e.g., entity computing system 102, third party computing system 106, etc.). By storing account information in active cache 134, account application circuit 132 can have unimpeded access to account information, thereby streamlining and improving user experience. In particular, account application circuit 132 can, upon verification of the user's identity, immediately provide information describing the user's account without having to wait for processing requests to be completed by external systems/devices. In this way, the user can be provided immediate access to at least some account information without waiting for processing requests to be fulfilled.

If a coupling between user device 104 and entity computing system 102 is available, active cache 134 can be updated based on various events/determinations to ensure account information stored in active cache 134 is current/up-to-date. For example, the data stored in active cache 134 can be updated in response to a determination by account application circuit 132 that the data in active cache 134 is old/stale. Said determination may occur in response to account application circuit 132 identifying that the account information in active cache 134 was last received an hour ago, a day ago, a week ago, etc. In this case, account application circuit 132 may operate to obtain new account information after a predetermined amount of time of not receiving new/updated data. For example, account application circuit 132 may generate and provide a request to entity computing system 102 for new/updated data. In this way, new data may be obtained periodically and/or sporadically depending on how account application circuit 132 defines old/stale data.

In some embodiments, the data stored in active cache 134 is updated as a result of an occurrence a triggering event. "Triggering events" can include various events that are associated with a need for new data to be retrieved by active cache 134. For example, some triggering events for updating the data stored in active cache 134 may include a user opening up an application provided by account application circuit 132, the user entering their username to login to the application, user device 104 being powered on/off, etc. Triggering events may include events that happen remotely from user device 104. For example, if entity computing system 102 manages financial accounts of users, a triggering event may include money being sent to/from a checking account of the user (e.g., by depositing a check). In this case, entity computing system 102 can identify the money transfer as a triggering event and automatically provide updated account information to user device 104 to be stored in active cache 134. In some embodiments, new data is automatically provided by entity computing system 102 periodically and/or in response to new data associated with the user being obtained by entity computing system 102.

As described above, active cache 134 ensures or substantially ensures a user has access to at least some information describing their account to provide continuous availability of account functionality. While the account information stored in active cache 134 may be dated/stale depending on when the data was last updated, a user experience is nonetheless improved by providing older account information as supposed to no account information. In other words, if the most up-to-date account information cannot be obtained (e.g., due to a connection to entity computing system 102 being unavailable), the user can still be served with some information regarding their account as opposed to nothing. If account information stored in active cache 134 is determined to be old, account application circuit 132 may flag and/or otherwise notify the user that the account information is old such that the user can appreciate that account information being observed may not be the most current information. For example, if a user is accessing financial information, active cache 134 may store an old account balance. The old account balance can be provided to the user via account application circuit 132 and can be flagged regarding when the account balance was last updated. Further, an indication of when the data/information was retrieved from may also be provided so that a user knows how old or stale the information may be. As such, the user can be provided with an understanding of a relative account balance, but can appreciate that a true account balance may be different depending on when the account information stored in active cache 134 was last updated.

In some embodiments, active cache 134 stores transactions for later processing if the transactions cannot be processed at a current time. As described herein, "transactions" can include any action that may result some change to account information. For example, transactions may include financial transactions such as purchasing an item from an online marketplace, a request by the user to update their personal information (e.g., phone number, address, email, etc.), an interaction with an application associated with account application circuit 132, etc. In standard systems, if entity computing system 102 processes transactions and cannot be accessed, any transactions attempted by the user may be immediately declined. Active cache 134, however, improves user experience by not immediately declining transactions in an event where entity computing system 102 cannot be accessed. Rather, active cache 134 can store the transactions such that the transactions can be reattempted until access to entity computing system 102 becomes available such that the transactions can be processed. In this way, the user need not manually reattempt transactions if entity computing system 102 is inaccessible. In some embodiments, if a transaction cannot be processed at a current time and is stored in active cache 134 for later processing, account application circuit 132 provides an alert to the user (e.g., via I/O device 136) to notify the user that the transaction cannot be currently processed, but will be stored for later processing.

In some embodiments, account application circuit 132 performs various processes to ensure security of active cache 134. In this case, application circuit 132 may utilize various security protocols in order to trigger some operation on account information stored in active cache 134. For example, if a user fails to access their account more than a predetermined amount of times (e.g., fails more than three times, more than five times, etc.), account application circuit 132 may initiate a partial or full deletion of account information stored in active cache 134. In this case, security of the account information may be prioritized over providing continuous availability of account information. Other triggers for performing some operation on account information may include, for example, user device 104 being unexpectedly accessed in a foreign country, an account of the user being flagged as being associated with fraudulent activity, the user failing to unlock user device 104 a predefined amount of times, etc. In this way, if account application circuit 132 determines any trigger has occurred, account application circuit 132 can modify the account information stored in active cache 134. Operations on the account information may include, for example, deletion of data, scrambling of data, further encrypting of data, etc.

In some embodiments, the data stored by active cache 134 is received from entity computing system 102 (e.g., via network 108). As described above, entity computing system 102 can be operated by various entities that manage, provide, and/or are otherwise associated with user accounts and information associated therewith. In particular, the user associated with user device 104 may have an account registered with the entity that operates entity computing system 102. As an example, the entity operating entity computing system 102 may be a financial entity (e.g., a bank, credit union, a payment services company, or other similar entities). However, it should be appreciated that the entity can be any entity capable of providing accounts for users. For example, the account provider may be a federal government entity providing accounts for citizens of a county, an online marketplace provider that allows users to purchase goods/services electronically, a social media provider, etc. In some embodiments, entity computing system 102 is considered a backend system that user device 104 can communicate with to access/update account information.

Entity computing system 102 is shown to include a processing circuit 112 and a network interface circuit 110 enabling entity computing system 102 to exchange information over network 108. In some embodiments, network interface circuit 110 and processing circuit 112 are similar to and/or the same as network interface circuit 124 and processing circuit 126 of user device 104, respectively. Network interface circuit 110 can include program logic that facilitates connection of entity computing system 102 to network 108. Network interface circuit 110 can support communication between entity computing system 102 and other systems, such as user device 104 and/or third party computing system 106. For example, network interface circuit 110 can include a cellular modem, a Bluetooth transceiver, a Bluetooth beacon, a radio-frequency identification (RFID) transceiver, and a near-field communication (NFC) transmitter. In some embodiments, network interface circuit 110 includes the hardware and machine-readable media sufficient to support communication over multiple channels of data communication. Further, in some embodiments, network interface circuit 110 includes cryptography capabilities to establish a secure or relatively secure communication session between entity computing system 102 and user device 104 and/or third party computing system 106. In this regard, information (e.g., account information, login information, financial data, and/or other types of data) may be encrypted and transmitted to prevent or substantially prevent a threat of hacking.

Processing circuit 112 is shown to include a processor 114 and memory 116. Processor 114 may be implemented as one or more application specific integrated circuits (ASICs), field programmable gate arrays (FPGAs), a group of processing components, or other suitable electronic processing components. Memory 116 may be one or more devices (e.g., RAM, ROM, Flash memory, hard disk storage) for storing data and/or computer code for completing and/or facilitating the various processes described herein. Memory 116 may be or include non-transient volatile memory, non-volatile memory, and non-transitory computer storage media. Memory 116 may include database components, object code components, script components, or any other type of information structure for supporting the various activities and information structures described herein. Memory 116 may be communicably coupled to processor 114 and include computer code or instructions for executing one or more processes described herein. In some embodiments, entity computing system 102 is a distributed computing system. In this case, entity computing system 102 may include multiple network interface circuits 110 and/or multiple processing circuits 112.

In some embodiments, entity computing system 102 is designed using commodity virtual machines (VMs), storage, and non-specialized routing. In this way, entity computing system 102 can scale with regards to various cloud platforms. As such, if entity computing system 102 is hosted by a cloud provider, entity computing system 102 can easily integrate with a cloud platform provided by the cloud provider.

Memory 116 is shown to include an account database 122. Account database 122 may include one or more storage devices structured to retrievably store account information associated with users and may include non-transient data storage mediums (e.g., local disc or flash-based hard drives, local network servers) or remote data storage facilities (e.g., cloud servers). In account management system 100, account database 122 (and thereby entity computing system 102) can operate as a source of data for account information. In some embodiments, account database 122 is hosted by a third party provider (e.g., a third party cloud provider). However, account database 122 is shown as a component of entity computing system 102 for ease of explanation. Account database 122 may implement various database frameworks for retrievably storing the account information. For example, account database 122 may be a MongoDB database, an Apache Cassandra database, etc.

Entity computing system 102 is shown to include an event fabric circuit 118. Event fabric circuit 118 is structured to perform real-time processing of incoming requests to entity computing system 102. For example, event fabric circuit 118 may be configured to (e.g., via processor 114) register new accounts for new users, update existing account information, delete account information (e.g., from account database 122), and/or other operations associated with management of accounts in account management system 100. In some embodiments, event fabric circuit 118 includes functionality for processing real-time data streams. For example, event fabric circuit 118 may include Apache Storm for performing distributed stream processing.

Event fabric circuit 118 can be designed for scale. In particular, event fabric circuit 118 can scale across data centers. Said scalability can ensure event fabric circuit 118 and associated event processing flows (described in detail below) work across availability zones (e.g., data centers).

Event fabric circuit 118 can be triggered based on a determination that operations associated with account information should be performed. For example, event fabric circuit 118 can be triggered responsive to a request to update account information received from user device 104. In effect, event fabric circuit 118 can fulfill various data processing needs for entity computing system 102. As described in greater detail below, event fabric circuit 118 can update account information, request account information from third parties (e.g., a third party computing system 106), send account information to user device 104, and/or perform any other operations associated with account information.

Based on a determination to perform some data processing operation, event fabric circuit 118 can initiate an appropriate operation to fulfill the data processing need. For example, if entity computing system 102 receives a request to process a transaction, event fabric circuit 118 may initiate an operation for processing the transaction. As another example, event fabric circuit 118 may determine that account information stored in active cache 134 is old and automatically initiate an operation to update the account information stored in active cache 134. As yet another example, if entity computing system 102 receives a request for account information from user device 104, event fabric circuit 118 can initiate an asynchronous data gathering process to retrieve said data from an appropriate device/system. In said example, if the account information is stored within account database 122, event fabric circuit 118 may be able to directly query account database 122 for the requested account information. However, if the account information is stored by an external entity (e.g., by third party computing system 106), event fabric circuit 118 may generate a data retrieval request and provide said data retrieval request to the external entity.

Advantageously, in an asynchronous data gathering process, data does not need to be transmitted in a continuous stream. In other words, data can be provided intermittently as opposed to continuously to a receiver. In this way, portions of data can take various travel paths (e.g., through various network nodes) and is not required to be transmitted through a single, continuous path. As such, asynchronous data gathering can provide for a more dynamic data gathering approach as compared to synchronous data gathering. Specifically, event fabric circuit 118 may be able to gather account information from various sources in tandem as opposed to consecutively in synchronous data gathering.

As shown in FIG. 1A, account management system 100 can include third party computing system 106. In some embodiments, account management system 100 includes multiple third party computing systems 106. Third party computing system 106 can be operated by various third party entities that are associated with user accounts. For example, if the entity managing entity computing system 102 is a financial institution, the third party entities may include credit card companies, companies that store and manage login information for user accounts, entities that calculate credit scores of users, cloud computing systems that store account information, and/or other various entities.

Third party computing system is shown to include a network interface circuit 138 and a processing circuit 140. In some embodiments, network interface circuit 138 and processing circuit 140 are similar to and/or the same as network interface circuit 110 and processing circuit 112, respectively. Likewise, processor 142 and memory 144 may be similar to and/or the same as processor 114 and memory 116 of entity computing system 102, respectively.

Third party computing system 106 and memory 144 are shown to include a user data retrieval circuit 146 and a database 148. In some embodiments, user data retrieval circuit 146 can allow third party computing system 106 to access and provide information stored in database 148. In some embodiments, database 148 is similar to and/or the same as account database 122. In particular, database 148 (and thereby third party computing system 106) can operate as a source of data for account information in account management system 100. In general, database 148 can store data associated with users and can retrieve said data in response to querying initiated by user data retrieval circuit 146. In this way, if event fabric circuit 118 requests account information from third party computing system 106 that is stored in database 148, user data retrieval circuit 146 can process the request to retrieve the information from database 148 and provide the information back (e.g., via network 108) to entity computing system 102. It should be appreciated that entity computing system 102 can include some and/or all of the functionality of third party computing system 106. For example, all account information and functionality for updating and providing said information may be handled by entity computing system 102. As such, third party computing system 106 may or may not be a component of account management system 100 dependent on if entity computing system 102 relies on third parties for certain functionality in account management system 100.

In some embodiments, event fabric circuit 118 processes prefetch requests. A prefetch request refers to a request for data that is generated in advance of an actual need for the data. For example, a prefetch request may be generated by account application circuit 132 in response to determining a user is attempting to login to access their account information. In said example, the prefetch request can be generated and provided to entity computing system 102 before the user has been successfully logged in and provided access to their account information. Prefetch requests can be generated responsive to various interactions a user may take. For example, prefetch requests may be generated responsive to GET and/or POST requests initiated by the user.

In some embodiments, prefetch requests are generated based on real-time determinations by user device 104 of what user may be attempting to access their account. For example, if a user is attempting to login to their account via account application circuit 132 by entering a username and password, a prefetch request can be generated based on what username is entered. In said example, the prefetch request can be generated and provided to entity computing system 102 before the password is entered by the user. As such, a retrieval process for the account information can be initiated by event fabric circuit 118 to ensure active cache 134 is updated with the account information as soon as possible. In an ideal situation, the account information is retrieved and stored in active cache 134 prior to the user logging in. However, even in the case where the user logs in prior to active cache 134 being updated, the account information may still be received sooner as opposed to user device 104 waiting to dispatch a request for account information until after the user logs in.

In some embodiments, generating a prefetch request may be the result of account application circuit 132 identifying cookies describing a user associated with user device 104. The cookies (or some other data identifying users) may be stored in active cache 134 and/or some other storage device of user device 104. As an example, cookies stored in active cache 134 may identify the last user to have logged in to an application associated with account application circuit 132. Based on the cookies indicating the last user to have logged in, account application circuit 132 can generate a prefetch request to gather account information associated with the anticipated user in advance of the user logging in. Said prefetch request can be generated at any point (e.g., upon opening the application) without any information needing to be provided by the user. In this way, the account information can be available in active cache 134 sooner as opposed to waiting to generate a request for account information until after the user has logged in. The prefetch request can be provided by user device 104 to entity computing system 102 (e.g., via network 108). Based on the prefetch request, event fabric circuit 118 can perform asynchronous data gathering to gather the account information to fulfill the prefetch request. In this way, the account information may be provided to and stored in active cache 134 in advance of the user logging in (assuming entity computing system 102 is accessible). Advantageously, even if the prefetch request is not fulfilled by the time the user logs in (i.e., the account information of the user is not stored in active cache 134 by the time the user logs in), the account information may nonetheless become available to the user sooner due to distributing the request earlier as compared to distributing the request in response to the user successfully logging in.

Entity computing system 102 is also shown to include a data encryption circuit 120. Data encryption circuit 120 can be configured to encrypt any data to be provided to network 108 (e.g., requests for data provided to third party computing system 106, account information provided to user device 104, etc.). Data encryption circuit 120 can incorporate various data encryption algorithms (e.g., SHA-3, RSA, AES, Blowfish, etc.) to encrypt data. In this way, if any data is accessed prematurely (e.g., before a user is verified), by a malicious entity, etc., the data should otherwise be protected. In some embodiments, data encryption circuit 120 applies various data compression algorithms to the data to improve data transfer across network 108. Data compression can also improve an amount of data stored by other devices/systems.

Data encryption circuit 120 can be particularly helpful if providing user account information to user device 104 to be stored in active cache 134. As described above, active cache 134 may receive account information before a user logs in and their identity is verified. In other words, the account information may be stored on user device 104 prior to verifying the identity of the user. Encrypting the data via data encryption circuit 120 can ensure that the data cannot be accessed prior to verifying the identity of the user. Further, in a situation where the user that logs in is not the anticipated user whose information is stored in active cache 134, encrypting the data can ensure the unanticipated user does not have access to the anticipated user's data. Said situation may occur, for example, if a secondary user accesses their account via a device associated with a primary user. In this case, a prefetch operation may be initiated based on cookies identifying the primary user such that active cache 134 is updated with information of the primary user. By encrypting account information, privacy of the primary user can be maintained even after the secondary user logs in.

Verification of user identities may be an important component of account management system 100 in ensuring that certain data is only accessed by intended users. In particular, data encrypted by data encryption circuit 120 should only be decrypted (e.g., by account application circuit 132) for access by a user responsive to ensuring the anticipated user is a true user attempting to access their account. Advantageously, verification of users can be performed by various components in account management system 100. In some embodiments, account application circuit 132 and active cache 134 support verification capabilities. Active cache 134 (or another component of user device 104) may store account verification details such that, if a user attempts to login via account application circuit 132, account application circuit 132 can compare information provided by the user to the stored account verification details. If the information provided by the user matches the stored account verification details, the user can be verified locally to user device 104 such that the user can access account information associated with their account that is stored in active cache 134, initiate transactions, etc.

In some embodiments, entity computing system 102 includes user identity verification functionality. Based on identity credentials (e.g., username and password, biometrics, etc.) provided to entity computing system 102, a component of entity computing system 102 (e.g., event fabric circuit 118) can check the credentials to verify the identity of the user. In this way, entity computing system 102 can provide verify the information of the user. In some embodiments, verification of user identities is performed by a third party (e.g., third party computing system 106) that can indicate to entity computing system 102 and/or user device 104 whether provided account credentials are sufficient to verify the identity of the user. Implementing identity verification in various components in account management system 100 can ensure that users only have access to account information associated with their accounts, can only initiate transactions relative to their accounts, etc.

Still referring to FIG. 1A, entity computing system 102 is shown to include a constrictor circuit 121. Constrictor circuit 121 can execute a constriction process on account management system 100. The constriction process can be used to test how account management system 100 reacts in response to various systems becoming inaccessible and can determine an impact on user experience associated therewith. In particular, the constriction process can include testing how user experience is affected based on sources of data (e.g., account database 122, third party computing system 106, etc.) becoming inaccessible and/or otherwise unable to provide account information. Based on results of the tests, constrictor circuit 121 can automatically update how account management system 100 operates in a way that can improve user experience. For example, constrictor circuit 121 may update how frequently active cache 134 is provided new data, establish additional methods for retrieving data, etc. In some embodiments, constrictor circuit 121 notifies an individual (e.g., an operator of entity computing system 102) that improvements to account management system 100 are needed to improve user experience such that the individual can perform manual changes. In some embodiments, constrictor circuit 121 is implemented in other components of account management system 100 additionally or alternatively to entity computing system 102. For example, constrictor circuit 121 may be implemented on user device 104.

As an example of a constriction process, constrictor circuit 121 may perform the constriction process to determine how user experience is affected if third party computing system 106 becomes inaccessible. In this example, if third party computing system 106 manages credit card information and becomes inaccessible, entity computing system 102 may not be able to retrieve information describing a credit card account of the user. In this case, the user may be provided information describing the credit card account previously stored in active cache 134. Based on what information is stored in active cache 134 describing the credit card account, constrictor circuit 121 can determine a relative impact to user experience. If the impact to user experience is determined to be low (e.g., the data stored in active cache is substantially reflective of a true state of the credit card account), constrictor circuit 121 may determine that few or no changes are required in account management system 100. However, if the impact to the user experience is determined to be substantial (e.g., a credit card balance stored in active cache 134 is $1,000 less than a true balance), constrictor circuit 121 may automatically update how account management system 100 operates. For example, constrictor circuit 121 may require active cache 134 to be updated with the credit card account information more frequently in standard operation (i.e., where all systems of account management system 100 are accessible). In this way, constrictor circuit 121 can identify inadequacies of account management system 100 prior to actual issues occurring that may negatively impact user experience.

Figure 1B:
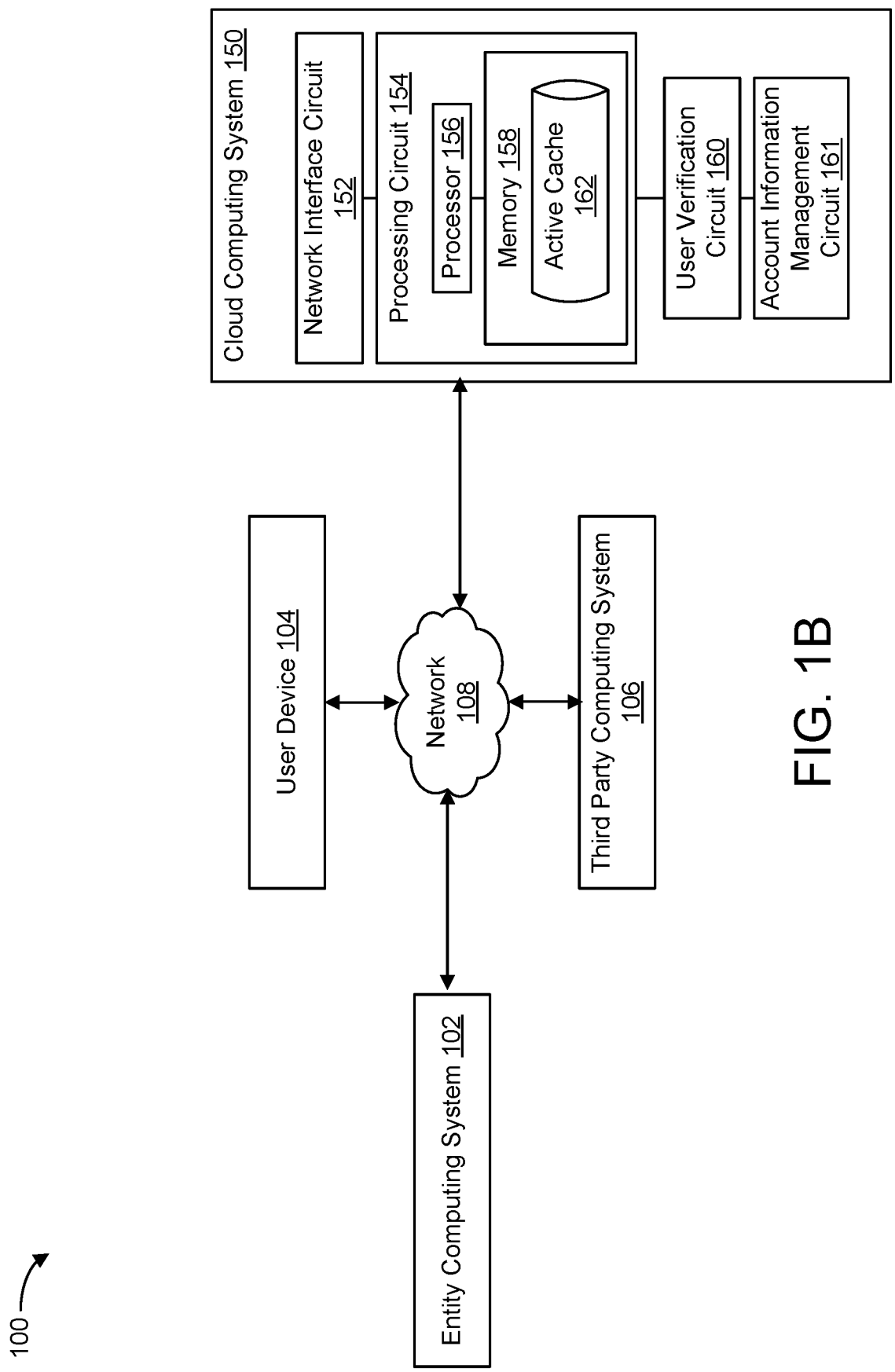
FIG. 1B is a block diagram of the account management system of FIG. 1A including a cloud computing system, according to some embodiments.

Referring now to FIG. 1B, a block diagram of account management system 100 including a cloud computing system 150 is shown, according to some embodiments. Cloud computing system 150 can provide an additional point of access to information regarding user accounts. In some embodiments, cloud computing system 150 supplements active cache 134 of user device 104 as described above with reference to FIG. 1A. In some embodiments, cloud computing system 150 is a substitute for active cache 134. As discussed in greater detail below, cloud computing system 150 can act as an additional failsafe in case of entity computing system 102 being inaccessible and/or unable to retrieve the most up-to-date account information for users. If integrated in account management system 100, cloud computing system 150 can various benefits such as reducing a computational load on user device 104 and allowing for more cached account information to be available to users. It should be appreciated that including active cache 134 on user device 104 may still be beneficial in case user device 104 cannot access network 108 in general. However, in the case where user device 104 can access network 108 but entity computing system 102 cannot fulfill requests, cloud computing system 150 can supplement active cache 134 to further improve user experience.

Cloud computing system 150 is shown to include a network interface circuit 152 and a processing circuit 154. In some embodiments, network interface circuit 152 and processing circuit 154 are similar to and/or the same as network interface circuit 110 and processing circuit 112 as described above with reference to FIG. 1A, respectively. Processing circuit 154 is shown to include a processor 156 and memory 158. In some embodiments, processor 156 and memory 158 are similar to and/or the same as processor 114 and memory 116 as described above with reference to FIG. 1A, respectively.

Cloud computing system 150 is shown to include a user verification circuit 160 and an account information management circuit 161. Likewise, memory 158 is shown to include an active cache 162. Active cache 162 may be similar to and/or the same as active cache 134. However, active cache 162 may be configured to store account information for multiple users that can be accessed by multiple user devices 104. As such, cloud computing system 150 includes user verification circuit 160 to verify and determine identities of users attempting to access their respective information stored in active cache 162.

User verification circuit 160 can verify identities of users in various ways. For example, if a user of user device 104 establishes an account with entity computing system 102, entity computing system 102 may require the user to register user device 104 with cloud computing system 150. In this way, if the user provides login information to account application circuit 132, the login information can be provided to user verification circuit 160 to verify the user's identity. In this case the user may login with the same login information as their account with entity computing system 102 or may be required to use unique login information associated with cloud computing system 150. User verification circuit 160 may use other methods for verifying a user's identity such as biometrics, PIN codes, email verification, etc.

Based on a successful verification of the user, account information associated with the user can be retrieved by account information management circuit 161 from active cache 162 and provided (e.g., via network 108) to user device 104. Before transmitting the account information over network 108, account information management circuit 161 may encrypt the data to protect the account information from undesired access. As such, account information management circuit 161 may include some and/or all of the functionality of data encryption circuit 120 as described above with reference to FIG. 1A.

Based on reception of account information from cloud computing system 150, user device 104 can display the account information to the user (e.g., via I/O device 136). In some embodiments, the account information provided by cloud computing system 150 includes a timestamp of when the information was last updated. If account information stored in active cache 134 also includes a timestamp, account application circuit 132 can determine what account information is more up-to-date (i.e., which account information has a timestamp closer to a current time). In other words, account application circuit 132 can determine what account information was stored at a later time. Based on the determination, account application circuit 132 can display the more up-to-date account information to the user (e.g., via I/O device 136).

Account information stored in active cache 162 can be updated similar to and/or the same as that of the account information stored in active cache 134. In particular, cloud computing system 150 can include account information management circuit 161 to manage and perform operations associated with account information in cloud computing system 150. As described above, account information management circuit 161 can retrieve data from active cache 162 to provide to user device 104. Account information management circuit 161 can also operate to ensure that the account information is as up-to-date as possible. To do so, account information management circuit 161 may request periodic updates (e.g., every minute, hourly, daily, etc.) of account information from entity computing system 102 if a connection to entity computing system 102 is available. In some embodiments, entity computing system 102 may automatically provide updated account information to cloud computing system 150 responsive to a triggering event as described in detail above with reference to FIG. 1A. In any case, account information management circuit 161 can ensure that account information for users that is stored in active cache 162 is updated to be reflective (or nearly reflective) of true account information.

As should be appreciated, cloud computing system 150 can improve user experience if entity computing system 102 is inaccessible. As cloud computing system 150 can be implemented separately from entity computing system 102, even if entity computing system 102 becomes inaccessible, cloud computing system 150 may nonetheless be accessible to retrieve account information. Further, cloud computing system 150 can reduce a processing burden on user device 104. Frequently updating account information stored in active cache 134 of user device 104 may require user device 104 to expend significant computational resources. For example, if all financial information regarding a user account is updated every minute by user device 104 while a connection to entity computing system 102 is available, user device 104 may expend significant processing power to constantly update information stored in active cache 134. Instead, if the financial information is also stored in active cache 162 of cloud computing system 150, user device 104 can perform less frequent updates of active cache 134. For example, account management system 100 can be configured such that active cache 134 is updated hourly and/or based on fewer triggering events whereas active cache 162 is updated every minute and/or based on more triggering events. In this way, the computational burden on user device 104 is reduced, thereby improving user experience.

Further, cloud computing system 150 may help reduce a storage footprint of active cache 134 on user device 104. Rather than caching all account information in active cache 134 of user device 104, active cache 134 can share the storage burden with active cache 162. In particular, active cache 134 may store critical account information whereas active cache 162 can store non-critical account information. In this way, user device 104 always has access to the critical account information, but is not burdened by storing non-critical account information. As such, in a case where user device 104 cannot access entity computing system 102 or cloud computing system 150, the user of user device 104 can nonetheless have access to the critical account information. In various embodiments, critical and non-critical account information can be set by a user based on what they deem important, by entity computing system 102 based on standard information deemed to be critical or non-critical, etc. In some embodiments, active cache 134 stores a subset of account information stored by active cache 162. In this case, active cache 162 may cache all account information that may be beneficial to provide to the user (e.g., both critical and non-critical information) whereas active cache 134 may only cache account information designated as critical.

As a specific example regarding a financial account of a user, critical account information may include a balance in a checking account whereas non-critical account information may include a current status of a mortgage. The checking account balance may be deemed as critical as the balance can change multiple times per day and as it may be important for a user to appreciate an approximate balance to be able to determine what purchases they can make with their available balance. However, mortgage information may not change frequently (e.g., mortgage information may change monthly when a payment is made), and therefore may not be as critical to user experience. Therefore, the checking account balance can be stored in active cache 134 and active cache 162 whereas the mortgage information may only be stored in active cache 162. In this way, even if user device 104 cannot access cloud computing system 150, the user can still be made aware of the critical account information.

Figure 2:
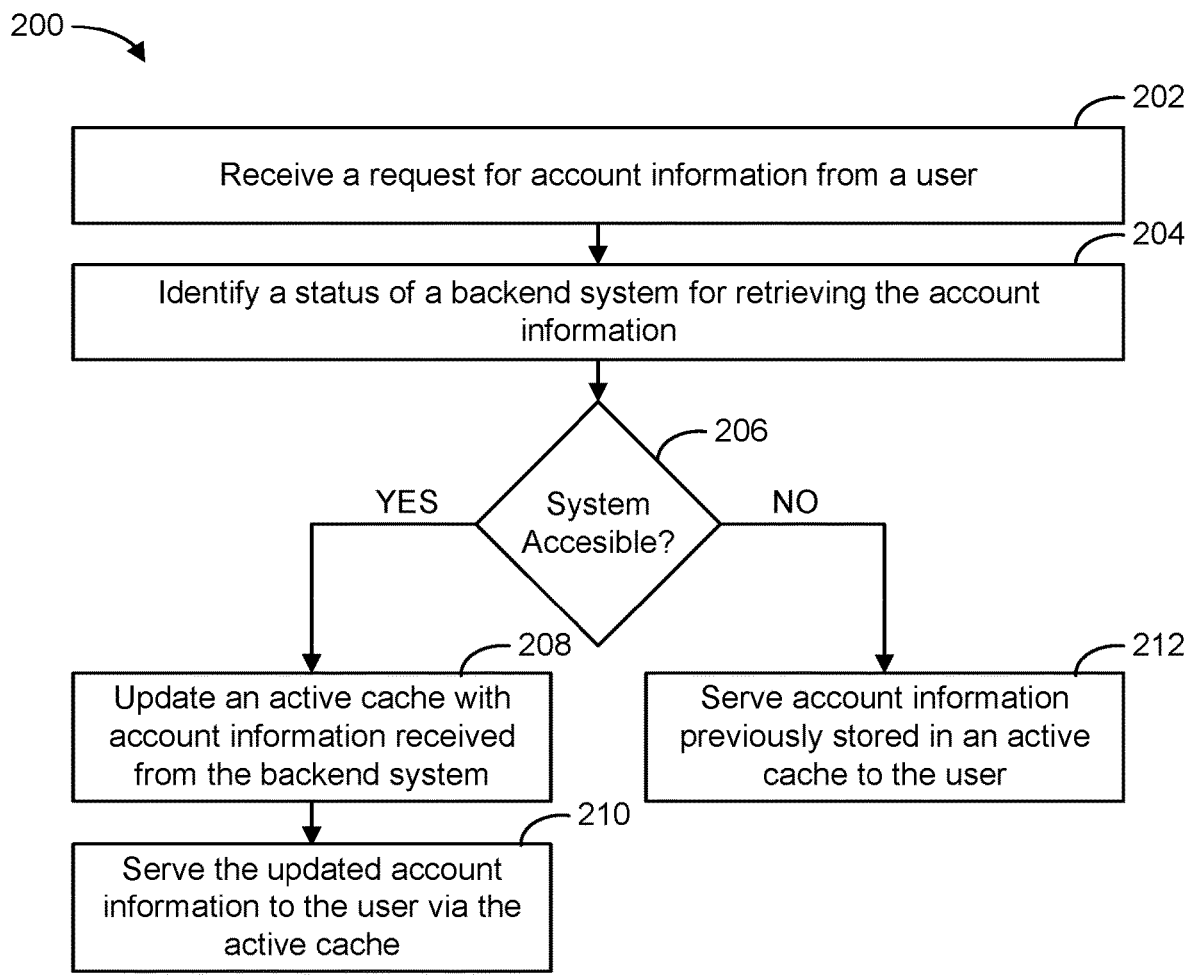
FIG. 2 is a flow diagram of a process for serving account information to a user, according to some embodiments.

Referring now to FIG. 2, a flow diagram of a process 200 for serving account information to a user is shown, according to some embodiments. In some embodiments, process 200 is performed responsive to a user attempting to access account information. For example, process 200 can be initiated as a result of the user opening a mobile application for accessing their account information. In some embodiments, some and/or all steps of process 200 are performed by components of account management system 100 as described above with reference to FIGS. 1A and 1B.

Process 200 is shown to include receiving a request for account information from a user (step 202). The request can be received based on various interactions the user may take. For example, the request may be based on a user opening a website or an application that allows the user to access their account information. As another example, the request may be generated as a result of the user logging into the website or application. In general, the request can be received as a result of the user performing some action that may result in the user requiring their account information. It should be appreciated that the request can include implicit requests (e.g., the user opening the application) and/or explicit requests (e.g., the user clicking a button that initiates a process to retrieve account information). In some embodiments, step 202 is performed by account application circuit 132 of user device 104.

Process 200 is shown to include identifying a status of a backend system for retrieving the account information (step 204). The status of the backend system can indicate whether the backend system is accessible to retrieve the account information. To determine the status, step 204 may include pinging the backend system and determining whether a response is received based on the ping. If a response to the ping is received, the backend system may be determined to be available. If a response is not received after a predetermined amount of time, the backend system may be determined to be inaccessible. In effect, step 204 can include determining whether the backend system can provide the account information to the user device. It should be appreciated that pinging the backend system is given for sake of example. Other methods of determining the status can be employed in step 204. For example, step 204 may include directly requesting the account information and determining the status based on whether the account information is received as a result of the request. In some embodiments, step 204 is performed by network interface circuit 124 and/or account application circuit 132 of user device 104.

Process 200 is shown to include determining whether the backend system is available (step 206). Said determination can be made based on the status identified in step 204. If the backend system is determined to be accessible (step 206, "YES"), process 200 can proceed to step 208. If the backend system is determined to not be accessible (step 206, "NO"), process 200 can proceed to step 212. In some embodiments, step 206 is performed by account application circuit 132 of user device 104.

Process 200 is shown to include updating an active cache with account information received from the backend system (step 208). If step 208 is performed, the backend system may be accessible. As such, it may be beneficial for overall user experience to retrieve the most up-to-date account information from the backend system. To retrieve the updated account information, step 208 can include distributing an asynchronous request to the backend system and updating the active cache based on information received in response to the asynchronous request. In some embodiments, the request is a synchronous request instead of an asynchronous request. In some embodiments, the active cache is a component of a device of the user (e.g., a smartphone, a desktop computer, a laptop, a smart watch, etc.). In some embodiments, the active cache is a component of a cloud computing system to which the device of the user can access to retrieve the account information. In some embodiments, step 208 is performed by account application circuit 132 and/or active cache 134 of user device 104. In some embodiments, step 208 is performed by account information management circuit 161 and/or active cache 162 of cloud computing system 150.

Process 200 is shown to include serving the updated account information to the user via the active cache (step 210). Based on updating the active cache in step 208, the active cache may include up-to-date (or near up-to-date) account information. The updated account information can be served directly to the user to fulfill the request originally received in step 202. In some embodiments, if the amount of time to receive the updated account information in step 208 is substantial (e.g., >1 second, >10 seconds, etc.), the user may temporarily be served with old account information stored in the active cache until the updated account information is received. In this case, the account information displayed to the user can be refreshed once the updated account information is received. Long delays in receiving updated account information may occur if, for example, a large amount of requests for account information are being received from the backend system thereby increasing retrieval times. In this case, displaying older account information may be preferred over displaying no information for an extended period of time. In some embodiments, step 210 is performed by account application circuit 132 and/or active cache 134 of user device 104.

Process 200 is shown to include serving account information previously stored in an active cache to the user (step 212). If step 212 is performed, the backend system may be inaccessible. To reduce impact of said inaccessibility, the user can be provided with older account information previously stored in the active cache. In this way, the user can be provided with some information regarding their account as opposed to no information at all. In some embodiments, the old account information is marked so the user can appreciate that the information being displayed may not be the most up-to-date information. For example, a timestamp may appear coinciding with the old account information to indicate a time when the account information was received. If the active cache does not include any previously stored information, step 212 may include providing an error message and/or some other notification to the user indicating that no account information is available. A lack of information in the active cache may occur if, for example, a current iteration of process 200 is the first time the user has accessed their account on a device performing process 200. In this case, the active cache may not have been previously populated with account information. In some embodiments, step 212 is performed by account application circuit 132 and/or active cache 134 of user device 104.

Figure 3:
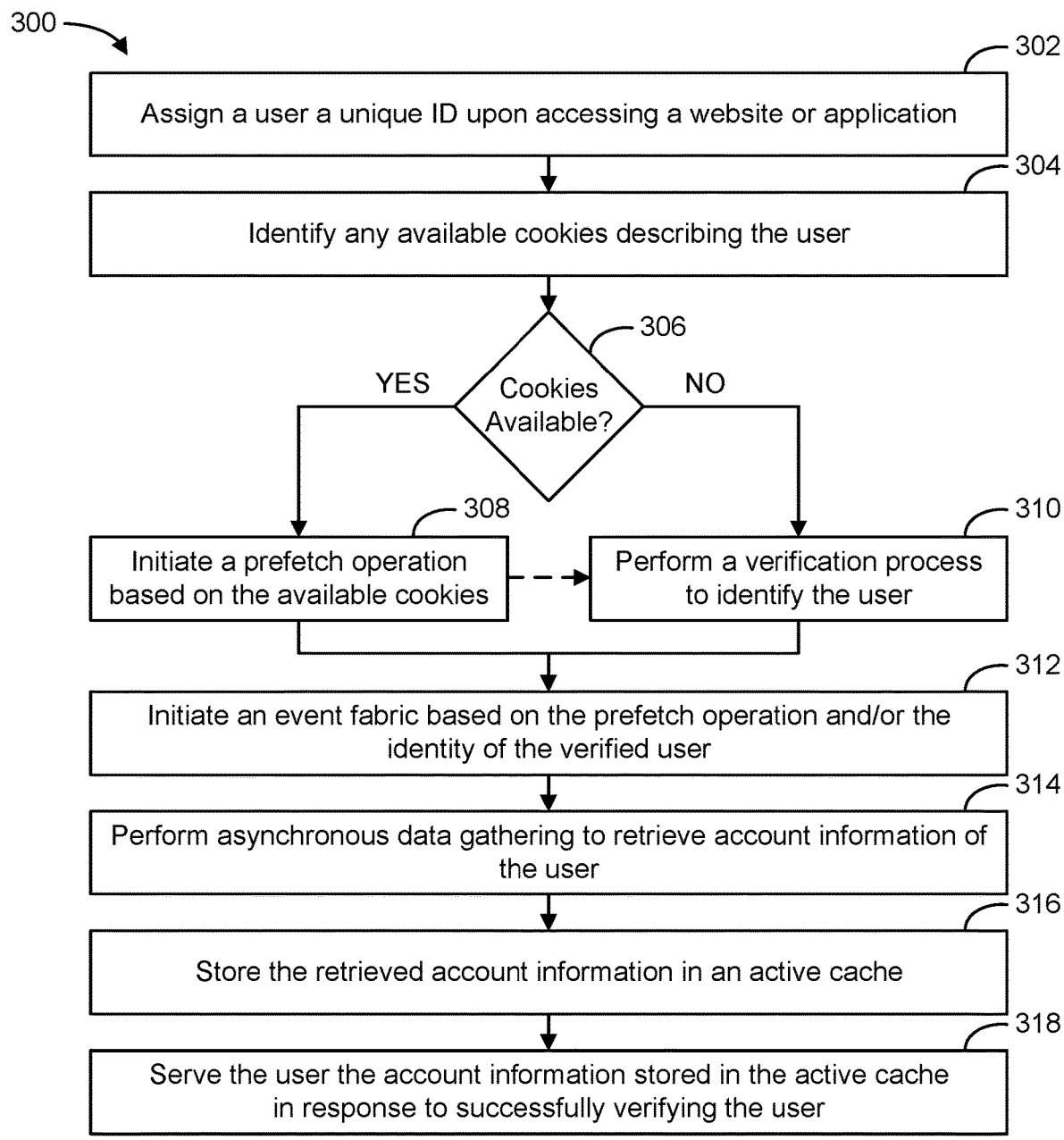
FIG. 3 is another flow diagram of a process for serving account information to a user, according to some embodiments.

Referring now to FIG. 3, a flow diagram of a process 300 for serving or providing account information to a user is shown, according to some embodiments. In some embodiments, process 300 describes how a backend system can interact with a user device of the user. In particular, process 300 illustrates an interaction between user device 104 and entity computing system 102 as described with reference to FIG. 1A, according to some embodiments. In some embodiments, process 300 is specific to a scenario where a connection between user device 104 and entity computing system 102 is active such that data can be transmitted between user device 104 and entity computing system 102. In some embodiments, some and/or all steps of process 300 are performed by various components of account management system 100.

Process 300 is shown to include assigning a user a unique ID upon accessing a website or application (step 302). The unique ID can be utilized to identify the user and determine where requests originate from and where information should be sent. In other words, the unique ID can identify a particular session active between a user device and a backend system. In some embodiments, the unique ID is associated with a user device of the user. For example, the unique ID may correspond to an Internet Protocol (IP) address, a media access control (MAC) address, etc. It should be appreciated that the website and application are provided for sake of example. The unique ID may be assigned responsive to the user interacting with any program, software, website, etc., that may result in data being exchanged between the user device and the backend system. In some embodiments, step 302 is performed by account application circuit 132 of user device 104 and/or event fabric circuit 118 of entity computing system 102.

Process 300 is shown to include identifying any available cookies describing the user (step 304). In some embodiments, the cookies are stored locally on the user device the user is using to access their account information. For example, if the user is attempting to access their account information on a website via a web browser, the cookies may be saved by the web browser during a previous session. As another example, the cookies may be available as part of a mobile phone application and indicate a previous user to have logged in via the application. In some embodiments, the cookies describing the user are saved in the backend system and are associated with the user device. For example, after a session is established between the user device and the backend system, the backend system may determine what cookies are associated with a specific IP address of the user device. In general, the cookies can be used to predict/anticipate what user is attempting to access account information. However, it should be appreciated that cookies are described for sake of example. Various other data sources describing users can be utilized to predict what user is attempting to access account information. In some embodiments, step 304 is performed by account application circuit 132 of user device 104 and/or event fabric circuit 118 of entity computing system 102.

Process 300 is shown to include determining whether any cookies are available (step 306). Step 306 can be based on whether any cookies were identified in step 304. If cookies are available (step 306, "YES"), process 300 can proceed to step 308. If cookies are unavailable (step 306, "NO"), process 300 can proceed to step 310. In some embodiments, step 306 is performed by account application circuit 132 of user device 104 and/or event fabric circuit 118 of entity computing system 102.

Process 300 is shown to include initiating a prefetch operation based on the available cookies (step 308). If cookies are available, an anticipated user may be able to be determined/predicted based on the cookies. For example, the anticipated user may be a user that last accessed their respective account information by the user device as indicated by the cookies. Based on the anticipated user, the prefetch operation can be initiated to gather account information associated with the anticipated user before the user logs in and/or performs some other identification process to verify an identity of the user. To initiate the prefetch operation, the user device can generate and provide a prefetch request to the backend system to begin a data gathering process to retrieve the account information of the anticipated user. In some embodiments, process 300 proceeds to step 312 after step 308. However, step 310 may also be performed to verify the user's identity. Particularly, it may be important to verify the user's identity to ensure the anticipated user is the same as a true user attempting to access their account information. In some embodiments, step 308 is performed by account application circuit 132 of user device 104.

Process 300 is shown to include performing a verification process to identify the user (step 310). If no cookies are available to determine an anticipated user, step 310 can be performed to determine what user is attempting to access their account information. To verify the user's identity, step 310 can include various verification processes. For example, step 310 may include confirming a username and password of the user, confirming biometrics (e.g., fingerprints, voice, eye veins, etc.) of the user, etc. In some embodiments, step 310 is performed even if cookies are available. Before presenting any account information to the user, the user should be verified. It should be understood that the anticipated user determined based on the cookies may or may not be a true user attempting to login. For example, one user may attempt to access their account information on a device typically associated with a different user (i.e., the anticipated user). As such, verifying the identity of the user attempting to access their account may be necessary to ensure account information of another user is not presented to the true user accessing their account. In some embodiments, step 310 is performed at a different point in process 300 than as shown. In some embodiments, step 310 is performed by account application circuit 132 of user device 104 and/or event fabric circuit 118 of entity computing system 102.

Process 300 is shown to include initiating an event fabric based on the prefetch operation and/or the identity of the verified user (step 312). The event fabric may be responsible for gathering account information associated with the user, providing the account information to the user, verifying the user on the backend system, etc. Step 312 can include various processes such as, for example, determining what user is accessing account information based on the identity, determining where the account information is stored (e.g., local to the backend system, by a third party computing system, etc.), what information should be gathered (e.g., personal information, financial account balances, social media posts, etc.), and/or other processes necessary to fulfill a request for account information. In some embodiments, step 312 is performed by event fabric circuit 118 of entity computing system 102.

Process 300 is shown to include performing asynchronous data gathering to retrieve account information of the user (step 314). Based on how the account information is stored as determined in step 312, the event fabric can generate and distribute data requests to appropriate databases, third parties, and/or other sources of data. In some embodiments, the event fabric streams the account information to the user device as the asynchronous calls are completed. In some embodiments, the event fabric aggregates the data and sends the account information in batch form to the user device after some and/or all of the asynchronous calls are completed. In some embodiments, step 316 is performed by event fabric circuit 118 of entity computing system 102.

Process 300 is shown to include storing the retrieved account information in an active cache (step 316). Based on the account information gathered in step 314, the active cache can be updated such that the active cache includes the most up-to-date account information for the user. In some embodiments, the active cache is hosted on the user device. In some embodiments, the active cache is hosted by a cloud computing system and/or other system the user device may have access to. By updating the account information stored in the active cache, account information can be accessible to the user even if a connection to the backend system cannot be later established. In some embodiments, step 316 is performed by account application circuit 132 and/or active cache 134 of user device 104. In some embodiments, step 316 is performed by account information management circuit 161 and/or active cache 162 of cloud computing system 150.

Process 300 is shown to include serving the user the account information stored in active cache in response to successfully verifying the user (step 318). In some embodiments, step 318 can only occur if the verification process performed in step 310 is successful in identifying the user. As process 300 is reflective of a scenario where a connection between the user device and the backend system is active, the account information served to the user from the active cache should be reflective of up-to-date (or nearly up-to-date) account information. However, if the connection were not active, the active cache would nonetheless have data stored that is relevant to the account information that can be provided to the user. To serve the account information, step 318 may include various processes such as displaying the account information on a screen of the user device, outputting audio describing the account information, etc. Step 318 can include any appropriate process for providing the account information to the user. In some embodiments, step 318 is performed by account application circuit 132 of user device 104.

Figure 4:
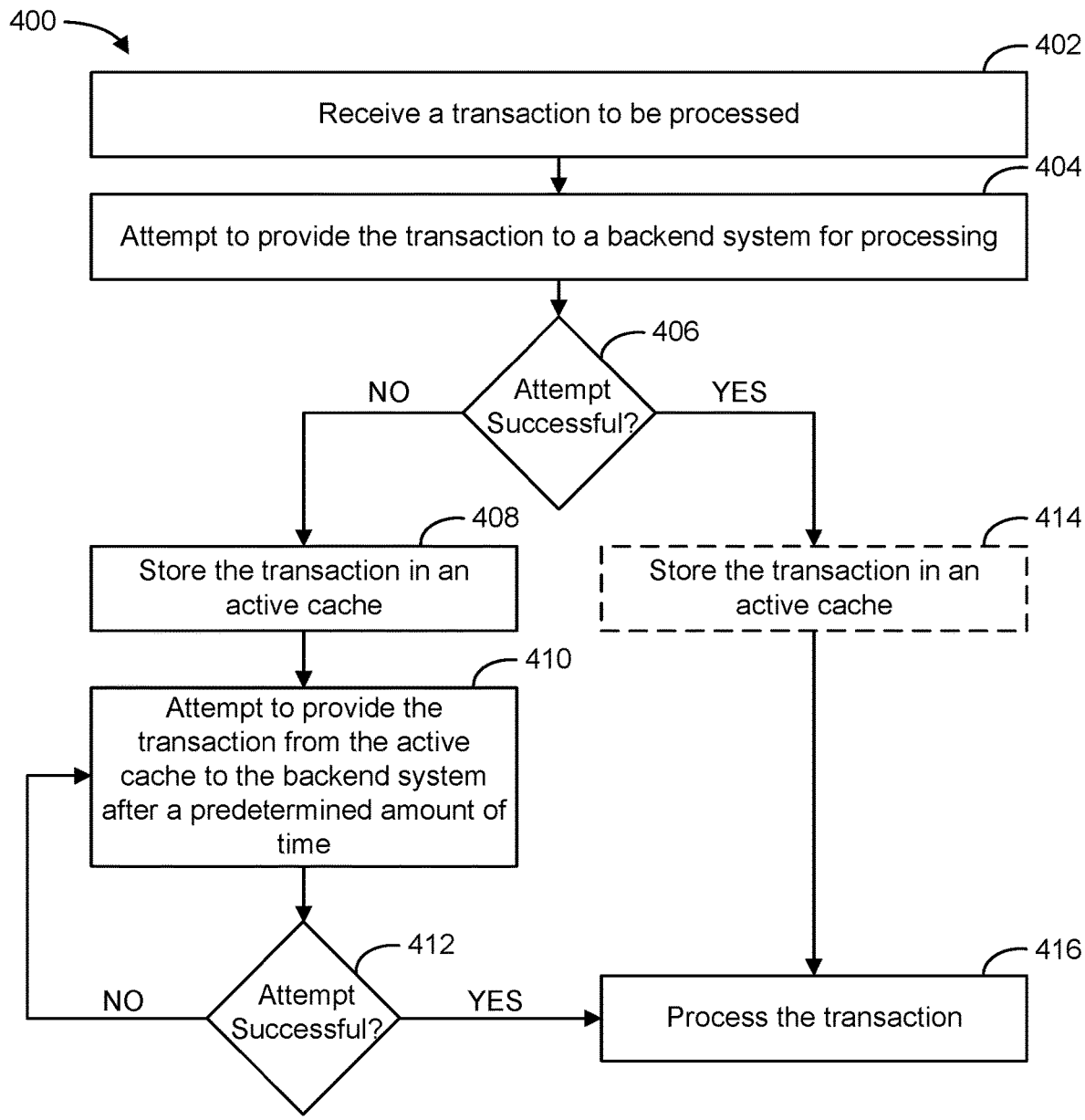
FIG. 4 is a flow diagram of a process for processing a transaction between a user device and a backend system, according to some embodiments.

Referring now to FIG. 4, a flow diagram of a process 400 for processing a transaction between a user device and a backend system is shown, according to some embodiments. As described above, transactions can include any action that may result some change to user account information. For example, transactions may include financial transactions such as purchasing an item from an online marketplace, a request by the user to update their personal information (e.g., phone number, address, email, etc.), a post to a social media account, uploading a photograph to an account profile, etc. Process 400 can illustrate benefits of incorporating an active cache into an account management system (e.g., account management system 100 as described with reference to FIGS. 1A and 1B). In particular, the active cache can prevent denials of transactions exclusively due to a connection between the user device and the backend system being unavailable. Instead, as described below, the active cache can allow the account management system to honor transactions and process the transactions at a later time once the connection is restored. Process 400 provides tangible benefits for a user in that the user does not need to manually reattempt transactions to get transactions to be processed. In some embodiments, process 400 is performed by components of account management system 100.

Process 400 is shown to include receiving a transaction to be processed (step 402). In some embodiments, the transaction is received by a user device of a user. The transaction can be generated as a result of various interactions a user can initiate. For example, the transaction may be generated and received by the user device as a result of the user attempting to update a status on a social media account via the user device. As another example, the transaction may be generated and received as a result of the user purchasing an item from a brick and mortar store (e.g., by initiating a tap exchange with the user device that includes a mobile wallet). In essence, the transaction can be received by the user device as a result of various interactions between the user and the user device. In some embodiments, step 402 is performed by account application circuit 132 of user device 104.

Process 400 is shown to include attempting to provide the transaction to a backend system for processing (step 404). Via a network (e.g., the Internet), the user device can transmit the transaction to the backend system. In some embodiments, the transaction may be able to be provided to the backend system if a connection between the user device and the backend system is active. However, providing the transaction to the backend system may fail if the connection is inactive. The connection may be inactive for a variety of reasons such as, for example, the backend system experiencing a power outage, the network itself is down, the user device does not have access to the network, etc. In some embodiments, step 404 is performed by network interface circuit 124 and/or account application circuit 132 of user device 104.

Process 400 is shown to include determining whether the attempt to provide the transaction to the backend system is successful (step 406). If the transaction is successfully provided to the backend system (step 406, "YES"), process 400 can proceed to step 414. If the transaction is not provided to the backend system (step 406, "NO"), process 400 can proceed to step 408. In some embodiments, step 406 is performed by account application circuit 132 of user device 104.

Process 400 is shown to include storing the transaction in an active cache (step 408). If step 408 is performed, the transaction may have failed to be received by the backend computing system. As such, the transaction can be stored in the active cache such that the transaction can be reattempted at a later time. In this way, rather than immediately declining the transaction, the transaction can be put in a "pending" status such that the transaction can be processed once/if the connection between the user device and the backend system is restored. In some embodiments, the active cache is local to the user device. In some embodiments, the active cache is a component of an external system (e.g., a cloud computing system). It should be appreciated that, if the transaction is stored on the external system, a connection between the user device and the external system should be active for the transaction to be stored. In some embodiments, step 408 is performed by account application circuit 132 and/or active cache 134 of user device 104. In some embodiments, step 408 is performed by account information management circuit 161 and/or active cache 162 of cloud computing system 150.

Process 400 is shown to include attempting to provide the transaction from the active cache to the backend system after a predetermined amount of time (step 410). In some embodiments, subsequent attempts to provide the transaction to the backend system are performed immediately/continuously without waiting for the predetermined amount of time. However, the predetermined amount of time can reduce computational burden on a device/system associated with the active cache by reducing a number of times providing the transaction is attempted. The predetermined amount of time can by manually set by the user, automatically set by the user device/external system, automatically set by the backend system, automatically by the network, etc.

By reattempting to provide the transaction to the backend system in step 410, the transaction is not automatically denied as a result of an initial failure to provide the transaction in step 404. In standard systems, a failure to transmit transactions may result in immediate denial of the transaction which can be frustrating for users. For example, with regards to a financial transaction, if a user attempts to make a purchase and has sufficient funds in their account to do so, a denial of the financial transaction due to a failure to establish a connection between the user device and the backend system may be frustrating. Instead, the financial transaction can be placed in a pending status until the connection is reestablished. This functionality allows the date, time, amount, and/or other information regarding the financial transaction to be honored even if processing of the financial transaction occurs after the financial transaction is initially made. In some embodiments, the user can cancel the transaction after being put into the pending status. If the user cancels the transaction, process 400 may end. In some embodiments, step 410 is performed by account application circuit 132 and/or active cache 134 of user device 104. In some embodiments, step 410 is performed by account information management circuit 161 and/or active cache 162 of cloud computing system 150.

Process 400 is shown to include determining if the attempt to provide the transaction from the active cache is successful (step 412). If the transaction is successfully provided from the active cache to the backend system (step 412, "YES"), process 400 can proceed to step 416. If the transaction is not provided from the active cache to the backend system (step 412, "NO"), process 400 can repeat at 410. In this way, the transaction can be reattempted to be provided until it is successfully provided to the backend system. In some embodiments, step 412 is performed by account application circuit 132 of user device 104. In some embodiments, step 412 is performed by account information management circuit 161 of cloud computing system 150.

Process 400 is shown to include storing the transaction in an active cache (step 414). Step 414 is shown as an optional step in process 400 as storing the transaction in the active cache may be unnecessary if the initial attempt to provide the transaction in step 404 is successful. However, storing the transaction in the active cache in step 414 may be beneficial for user experience. Particularly, storing the transaction in the active cache may ensure that the active cache includes up-to-date information for later retrieval. In some embodiments, step 414 is performed by account application circuit 132 and/or active cache 134 of user device 104. In some embodiments, step 414 is performed by account information management circuit 161 and/or active cache 162 of cloud computing system 150.

Process 400 is shown to include processing the transaction (step 416). If step 416 is performed, the backend system may have received the transaction. As such, the backend system can proceed with initiating any operations necessary to process the transaction. For example, with regards to a financial transaction for making a purchase, the backend system may deduct an amount from the user's banking account, provide the amount to a recipient banking account, log the financial transaction, etc. As another example, with regards to a transaction for posting to a social media account, the backend system may update a social media feed of the user, distribute the post to other users, etc. In some embodiments, processing of the transaction in step 416 functions as a triggering event as described above with reference to FIG. 1A. If processing the transaction is treated as a triggering event, step 416 may include updating the active cache with up-to-date account information. In some embodiments, step 416 is performed by event fabric circuit 118 of entity computing system 102.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. Each respective "circuit" may include machine-readable media for configuring the hardware to execute the functions described herein. In some embodiments, a "circuit" may only be machine-readable media that is executable by separate hardware (e.g., one or more processors). The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A system comprising:
   a processing circuit comprising one or more processors coupled to non-transitory memory, wherein the processing circuit is configured to:
   store a cookie associated with a user device of a user;
   receive a prefetch request based on the cookie associated with the user device of the user for account information in advance of a user request for the account information, the account information relating to an account of the user;
   identify the user based on the stored cookie associated with the user device of the user;
   verify the identity of the user based on a received credential regarding the user;
   perform asynchronous data gathering by receiving data intermittently over one or more network nodes to retrieve the account information based on the prefetch request and the verification of the identity of the user;

receive an indication of critical account information from the user;
receive a request for account information from the user based on an opening of a website or an application to access the account information;
provide the critical account information to an active cache of a user device that proactively updates stored critical account information based on receiving the request, wherein the critical account information is stored in the active cache of the user device for later retrieval;
perform a constriction process that determines how an experience of the user is impacted in response to the system becoming inaccessible;
provide a notification regarding the constriction process; and
update a process for providing the critical account information to the user device based on the constriction process.

2. The system of claim 1, wherein the processing circuit is configured to encrypt the critical account information.

3. The system of claim 1, wherein performing asynchronous data gathering comprises:
generating a data retrieval request;
providing the data retrieval request to a third party storing the account information; and
receiving the account information from the third party.

4. The system of claim 1, wherein the processing circuit is configured to:
receive a transaction stored in the active cache when a connection between the system and the user device is inactive, the transaction associated with a time of the transaction that is different than a current time; and
process the transaction based on the time of the transaction rather than the current time.

5. A mobile device comprising:
a processing circuit comprising one or more processors coupled to non-transitory memory, wherein the processing circuit is configured to:
identify a cookie relating to a user;
generate a prefetch request based on the cookie for account information in advance of a user request for the account information, the account information relating to an account of the user;
receive a credential regarding the user;
receive an indication of critical account information from the user;
provide the prefetch request and the credential to a remote computing system for verifying an identify of the user;
determine a status of the remote computing system coupled to the mobile device for retrieving the account information;
receive a request for account information from the user based on an opening of a website or an application to access the account information; and
in a first instance in response to a determination that the remote computing system is inaccessible and upon a successful verification of the identity of the user, provide the critical account information to the user via an active cache of the mobile device that proactively updates stored critical account information based on receiving the request, the active cache configured to store the critical account information.

6. The mobile device of claim 5, wherein the processing circuit is configured to:

receive a transaction to be processed by the remote computing system;
provide the transaction to the remote computing system for processing;
in response to a determination that the transaction is not received by the remote computing system, store the transaction in the active cache; and
provide the transaction from the active cache to the remote computing system after a predetermined amount of time.

7. The mobile device of claim 5, wherein the processing circuit is configured to:
in a second instance in response to a determination that the remote computing system is accessible, receive the account information from the remote computing system; and
update the active cache with the account information received from the remote computing system.

8. The mobile device of claim 5, wherein the processing circuit is configured to:
receive secondary account information stored by a cloud computing system;
compare the secondary account information to at least some of the account information stored by the active cache to determine account information stored at a later time; and
provide the account information stored at the later time to the user.

9. The mobile device of claim 5, wherein determining the status of the remote computing system comprises:
pinging the remote computing system; and
determining the status based on whether a response to pinging the remote computing system is received.

10. The mobile device of claim 5, wherein the critical account information is financial account information relating to a financial account of the user.

11. The mobile device of claim 5, wherein the processing circuit is configured to:
in response to a determination that the account information stored in the active cache is stale, generate and provide a request for updated account information to the remote computing system.

12. A method comprising:
identifying, by an account application circuit of a mobile device, a cookie associated with a user of the mobile device;
generating, by the account application circuit, a prefetch request based on the cookie for account information in advance of a user request for the account information, the account information relating to an account of the user;
receiving, by the account application circuit, a credential regarding the user;
receiving, by the account application circuit, an indication of critical account information from the user;
providing, by a network interface circuit of the mobile device, the prefetch request to a backend system for verifying an identity of the user;
determining, by the account application circuit, a status of the backend system for retrieving the account information;
receiving, by the account application circuit a request for account information based on an opening of a website or an application to access the account information; and
in a first instance in response to a determination that the backend system is inaccessible and upon a successful verification of the identity of the user, providing, by the account application circuit, the critical account information to the user via an active cache of the mobile device that proactively updates stored critical account information based on receiving the request, the active cache configured to store the critical account information.

13. The method of claim 12, further comprising:
receiving, by the account application circuit, a transaction to be processed by the backend system;
providing, by the network interface circuit of the mobile device, the transaction to the backend system for processing;
in response to a determination that the transaction is not received by the backend system, storing, by the account application circuit, the transaction in the active cache; and
providing, by the network interface circuit, the transaction from the active cache to the backend system after a predetermined amount of time.

14. The method of claim 12, further comprising:
in a second instance in response to a determination that the backend system is accessible, receiving, by the network interface circuit, the account information from the backend system; and
updating, by the account application circuit, the active cache with the account information received from the backend system.

15. The method of claim 12, further comprising:
receiving, by the network interface circuit, secondary account information stored by a cloud computing system;
comparing, by the account application circuit, the secondary account information to at least some of the account information stored by the active cache to determine account information stored at a later time; and
serving, by the account application circuit, the account information stored at the later time to the user.

16. The method of claim 12, wherein determining the status of the backend system comprises:
pinging, by the network interface circuit, the backend system; and
determining, by the account application circuit, the status based on whether a response to pinging the backend system is received.

17. The system of claim 1, wherein the critical account information is financial account information relating to a financial account of the user.

18. The method of claim 12, wherein the critical account information is financial account information relating to a financial account of the user.

19. The method of claim 12, wherein the cookie identifies the user as having logged in to an application associated with the account application circuit.

20. The method of claim 12, further comprising:
in response to a determination that the account information stored in the active cache is stale, generating and providing, by the account application circuit a request for updated account information to the backend system.

* * * * *